Figure 1:
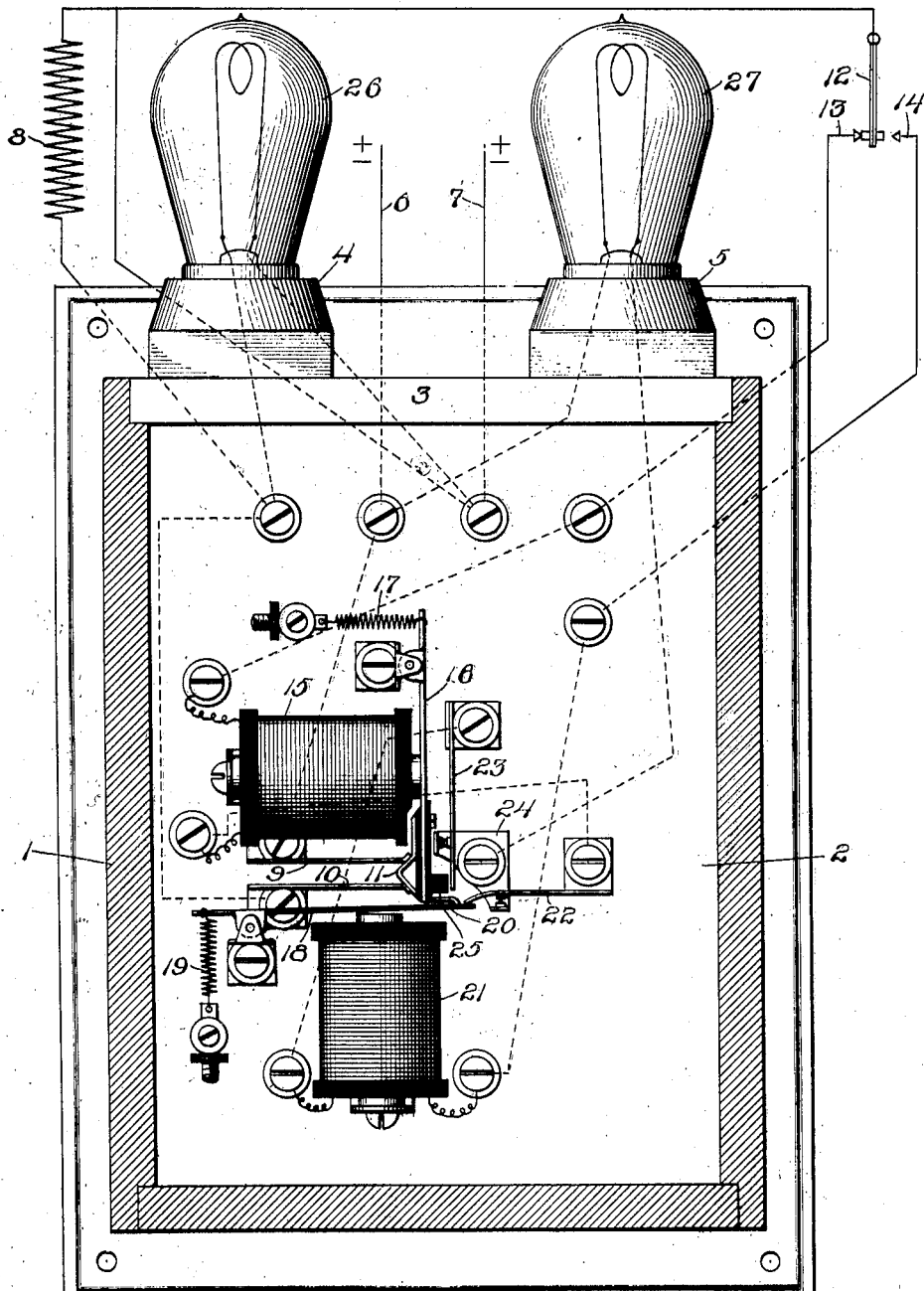

W. J. SMITH.
THERMOREGULATOR.
APPLICATION FILED JUNE 30, 1911.

1,080,493.

Patented Dec. 2, 1913.
2 SHEETS—SHEET 1.

W. J. SMITH.
THERMOREGULATOR.
APPLICATION FILED JUNE 30, 1911.
1,080,493.
Patented Dec. 2, 1913.
2 SHEETS—SHEET 2.
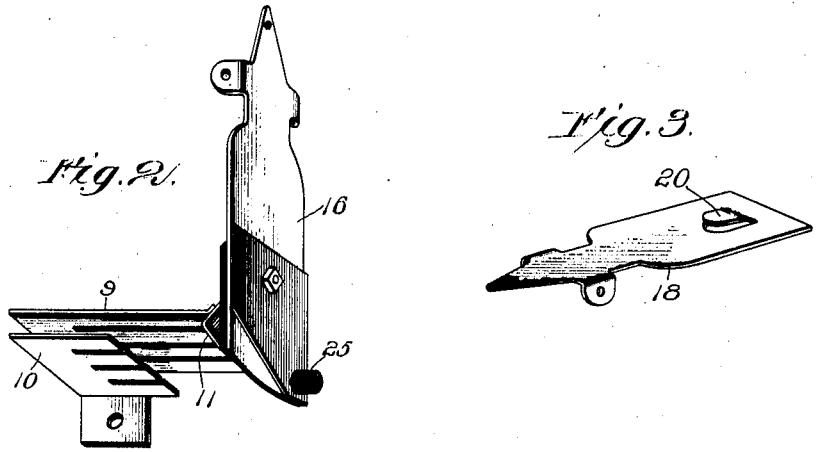
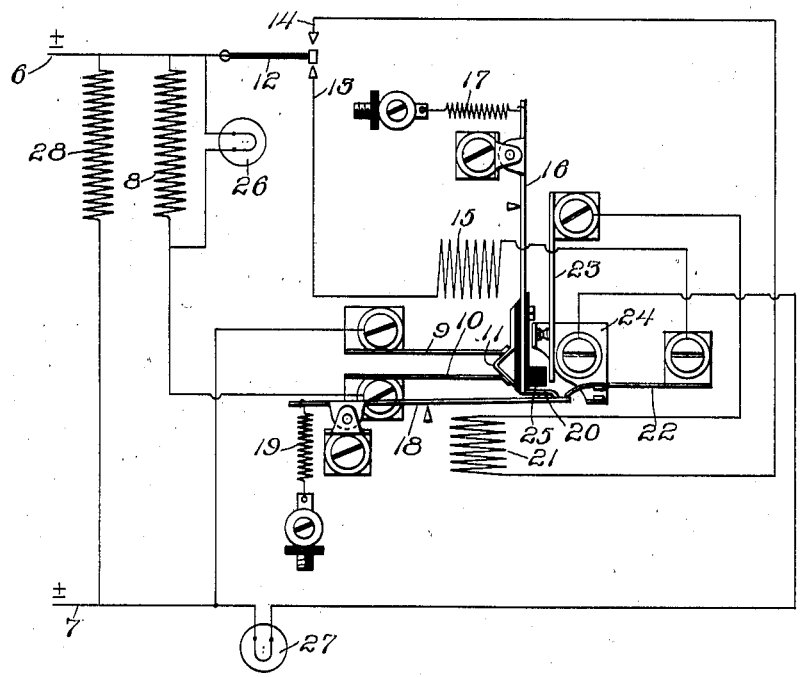
Witnesses:
Harry S. Gaither
Lillian Winsberg
Inventor:
William J. Smith
by Arba B. Marvin
Atty.

UNITED STATES PATENT OFFICE.

WILLIAM J. SMITH, OF URBANA, ILLINOIS.

THERMOREGULATOR.

1,080,493.   Specification of Letters Patent.   Patented Dec. 2, 1913.

Application filed June 30, 1911. Serial No. 636,193.

*To all whom it may concern:*

Be it known that I, WILLIAM J. SMITH, a citizen of the United States, residing at Urbana, in the county of Champaign, State of Illinois, have invented certain new and useful Improvements in Thermoregulators, of which the following is a specification.

It is the object of the present invention to provide a system whereby a nearly constant temperature may be maintained in a heated chamber, such as an oven, an incubator, or the like.

To this end the preferred embodiment of my present invention includes an electric heater, and means for automatically switching current on and off at the proper times to maintain the temperature constant. The automatic means includes a thermostat which is exposed to heat from said heater and also includes a relay of improved form which is actuated by said thermostat and serves to produce the necessary movement of the switch mechanism. The circuits of the system are so arranged that the thermostat and its coöperating relay are supplied by current carried through a circuit which shunts the main or heating circuit of the system.

Also the invention includes certain details and special arrangements of parts whereby the current through the relay is interrupted after each movement of the switch, all of which is disclosed in detail in the following description which is to be taken in conjunction with the accompanying drawings.

In the drawings, Figure 1 is an elevation of the relay and some of the elements which coöperate therewith, illustrating diagrammatically the arrangement of the electrical circuit. Fig. 2 is a perspective view of a portion of the main switch and the armature whereby that switch is manipulated. Fig. 3 is a perspective view of an armature which serves as a means for holding the main switch in closed position. Fig. 4 is a diagrammatic representation of a system somewhat different from that of Fig. 1.

In the construction shown, the device comprises a box 1, having therein a vertical panel 2 of insulating material which carries at its top a cross piece 3 whereon two lamp sockets 4 and 5 are mounted.

Current may be supplied to the system through distributing conductors 6 and 7 and this current may pass directly through the heating resistance 8 by way of a main switch which comprises spring clips 9 and 10 and a wedge shaped member 11. The member 11 is movable in contact with clips 9 and 10 to establish connection therebetween. Fig. 2 shows one of these clips on an enlarged scale.

Heater 8 constitutes the work circuit of the system and is the heater whereby the oven, incubator or other chamber is heated to the desired temperature. Located in coöperative relation with said heater 8 is a thermostat 12 of the usual expansion type, the movable member of which is connected with that side of resistance 8 which receives current directly from the distributing conductor 7. The other two contacts or terminals 13 and 14 of the thermostat are electrically connected with a relay serviceable for throwing the contact member 11 of the main switch.

The relay, whereby the main switch is controlled or operated, includes an electromotive device which comprises a winding 15 arranged horizontally across the face of panel 2 and having an iron core which, when magnetized, serves to attract a vertically mounted armature 16. This armature is provided with an adjustable coiled spring 17, which tends to hold the lower end of armature 16 away from winding 15. Armature 16 carries at its lower end an insulating strip on which is mounted the wedge shaped contact member 11 of the main or heater switch. When the armature moves inward or outward under the action of winding 15 or spring 17, the main switch will thereby be closed or opened. Below the main switch is a second armature 18, pivotally mounted, and provided with an adjustable spring 19 which tends to force the end of the armature upward against the lower end of armature 16. This second armature has an upstanding lug or catch 20 which engages with the side of armature 16 and serves to hold that armature close to its winding, thereby holding the main switch closed. A winding 21 is arranged on the face of panel 2 with its axis vertical and with its magnetic core in position to draw down on the holding armature 18.

In addition to the main switch controlling the current to the heater winding 8, switches are provided for controlling the current to windings 15 and 21, these switches being numbered respectively 22 and 23.

Each switch has a contact which is connected directly with a contact plate 24. Switch 22 is so located that its outer end projects above the holding armature 18, with the result that when the armature is tilted upward through the action of its spring 19, switch 22 will be opened and the current through winding 15 will be interrupted. Switch 23 is so disposed that it can be opened through the action of an insulating lug 25 which is carried at the lower end of the armature 16 and moves therewith.

The operation of the system above described is as follows: Current entering through distributing conductor 7 may pass directly to the heater winding 8 and then through the main switch to distributing conductor 6. It is this current which serves to heat the oven or incubator to the desired temperature. A pilot lamp 26 of high resistance may be inserted in shunt to this heater, if desired, to show the voltage conditions at the heater, or to indicate when the heater is on or off. After the heater has raised the temperature of the oven or incubator to the desired value, the heat will act on thermostat 12, warping it over into such position that contact will be made at 14. Current will then be sent from distributing conductor 7 through the thermostat and down to winding 21 and thence through the auxiliary switch 23 and plate 24 to lamp 27, and finally to the other distributing conductor 6. Lamp 27 serves as a resistance to protect the windings of the relay; simultaneously, it serves as an indicator of the current conditions in the relay. The current flowing through winding 21 pulls down on the holding device 18, thereby unlatching the lower end of armature 16 and allowing it to swing upward; this opens the main switch 11. Simultaneously, the outward movement of armature 16 opens switch 23 and interrupts the flow of current through winding 21, while at the same time the downward movement of armature 18 closes switch 22 and puts the system in such condition that on the return swing of the thermostat, the relay will be ready to receive current through winding 15. The main switch remains open only long enough to bring the temperature back to about normal, and thereupon thermostat 12 swings over and establishes contact at 13, current flows through winding 15, and main switch 11 reestablishes the flow of current through the heater 8. Almost instantly the switch 22 opens and switch 23 closes. This places the several parts in the relative positions shown in Fig. 1.

It will be seen that the thermostat and its coöperating relay are in a circuit which shunts the main or heater circuit, and it will be noticed furthermore, that the flow of current through winding 15 or winding 21 is of but momentary duration and is interrupted by an auxiliary switch immediately after the desired movement of the main switch. There is therefore, no appreciable heating of the windings and no continuous consumption of energy.

Inasmuch as the current flowing through the thermostat is interrupted by one of the auxiliary switches immediately after the establishment of that current at the thermostat, there is no breaking of current at the thermostat and no destructive arcing at its contact points. The thermostat can therefore be of delicate construction and adjustment.

The construction illustrated diagrammatically in Fig. 4 is the same as that illustrated in Fig. 1 except for the addition of another heater 28, which is connected directly across the distributing conductors 6 and 7 and thus is constantly in circuit irrespective of the manipulations of the main switch. This winding 28 is intended to heat the oven or incubator to a temperature only a few degrees below normal temperature, reliance being placed on the winding 8 to supply some additional heating; thereby effecting such regulation as may be necessary to maintain substantially constant temperature within the oven or incubator.

What I claim as new and desire to secure by Letters Patent of the United States is:—

1. In an electrical system, the combination of a work circuit including a switch, an electromotive device for closing said switch, means for holding said switch in closed position, a winding for tripping said holding means, means for delivering current to said electromotive device and to said tripping winding to move said switch and means for limiting the flow of current through said electromotive device and through said tripping winding to currents of short duration.

2. A heating system comprising, in combination, an electric heater, a switch in circuit with said heater, a thermostat exposed to heat from said heater, a winding connected to receive current through said thermostat and having an armature adapted to close said heater switch, said armature having a spring effective for opening said switch, means for holding said switch in closed position, a winding arranged for tripping said holding means, said tripping winding being connected to said thermostat, and an auxiliary switch in circuit with each of said windings and movable automatically when said heater switch moves.

3. A heating system comprising, in combination, an electric heater, a switch in circuit with said heater, a thermostat exposed to heat from said heater, a winding receiving current through said thermostat and having a spring-pressed armature arranged to open and close said heater switch, means for holding said switch in closed position, a winding for tripping said holding means, and automatic means for cutting off the current through said windings immediately after movement of said switch, said thermostat and said windings being in a circuit which shunts the electric heater and its switch.

4. The combination, with a thermostat of a relay coöperatively related therewith, said relay having a winding connected with one pole of said thermostat, and an armature movable toward said winding when the current flows through said winding, means for holding said armature close to said winding, a second winding connected with the other pole of said thermostat and in position to trip said holding means, a switch in circuit with each of said windings, one of said switches being arranged to open when said armature is attracted by its winding and the other of said switches being adapted to open when said armature moves away from its winding.

5. The combination of distributing conductors, an electric heater connected through a switch to said conductors, a thermostat heated by said electric heater, a winding adapted to receive current through said thermostat and having an armature for closing said switch, means for holding said switch in closed position, a winding for tripping said holding-means, said tripping winding being connected to receive current through said thermostat, and an auxiliary switch for each of said windings, each of said auxiliary switches being movable automatically to open the circuit through its winding after a movement of said heater switch.

6. The combination of distributing conductors, an electric heater connected through a switch to said conductors, a thermostat heated by said electric heater, a winding connected to receive current through said thermostat, an armature pivoted in position to be attracted by said winding when current flows therein, said armature carrying a contact member of said switch, a spring tending to force said armature away from said winding to thereby open said switch, means for holding said armature in its attracted position, a second winding connected to receive current through said thermostat and positioned to attract said holding means when current flows in said winding, an auxiliary switch for each of said windings, one of said auxiliary switches moving in and out in conformity with the movement of said armature and the other of said auxiliary switches being movable in unison with the movement of said holding means.

In witness whereof I have hereunto subscribed my name, this 24 day of June 1911.

WILLIAM J. SMITH.

Witnesses:
C. M. McConn,
Edward Bartow.